2,783,258

UNSATURATED ORGANIC COMPOUNDS AND THEIR PREPARATION

Walter D. Celmer, Glen Oaks, N. Y., assignor to Chas. Pfizer & Co., Inc., Brooklyn, N. Y., a corporation of Delaware No Drawing. Application November 8, 1951, Serial No. 255,524

8 Claims. (Cl. 260—413)

This invention relates to novel, highly unsaturated organic compounds and, in particular, to certain highly unsaturated, aliphatic organic acids which possess biological activity. This invention is also concerned with methods for preparing such compounds and with various intermediates useful in their preparation.

There have now been produced certain highly unsaturated organic acids and their derivatives, not previously known, which surprisingly possess considerable activity against living microorganisms, notably mycobacteria. These new acids may be represented by the general formula:

In the synthesis of such compounds several novel intermediates have also been discovered, especially a series of 3-ene,5-ynoic acids with the structure:

as well as various isomers and like rearrangement products thereof. In each of the above formulas, R, R′ and R″ can be alike or not, and may be hydrogen or preferably at least in part alkyl groups. Too, the COOH group in each structure may be replaced by "X" to obtain derivatives of the acid function, such as amides, nitriles, metal salts and esters, where X is respectively CONH$_2$, CN, COO metal and COO alkyl. Indeed, the derivatives may be first prepared and serve as intermediates for the acids. Cistrans isomerism is possible in such compounds. In general only one form is obtained, but inversion may then be accomplished by known methods.

The process whereby the new, biologically active acids and their derivatives are ultimately prepared, and wherein the aforementioned eneynoic acid compounds are recovered as intermediates, broadly comprises condensing an acetylenic compound with a 2,3-unsaturated aliphatic aldehyde, halogenating the alcohol thus obtained and simultaneously rearranging the double bond position, treating the product with cuprous cyanide at an elevated temperature to form a nitrile, hydrolyzing this compound to form a 3-ene,5-ynoic acid intermediate, selectively reducing the acetylenic bond with hydrogen, and finally recovering the 3,5-dienoic acid product.

The first part of this new method is the condensation of aldehyde with an acetylenic material. By the latter phrase is meant acetylene itself, or preferably a mono-substituted alkyl acetylene in the form of an alkali metal compound or a Grignard reagent. Examples of useful 2,3-unsaturated aliphatic aldehydes are acrolein or crotonaldehyde. This reaction may be illustrated as follows:

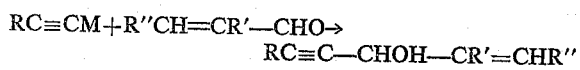

where R, R′ and R″ are hydrogen or preferably like or unlike alkyl groups and M is an alkali metal or a halo-magnesium group (e. g. MgI or MgBr). Condensation is best effected in an inert solvent; in the case of the alkali metal acetylenic compounds, the solvent may be anhydrous liquid ammonia. The acetylenic Grignard reagents can be prepared from the corresponding mono-alkyl acetylene by conventional treatment with ethyl magnesium bromide or other suitable agent. After the condensing reaction has been completed, any intermediate complex may be decomposed for instance with ammonium chloride and the secondary alcohol product isolated.

Halogenation with double bond rearrangement of the carbinols obtained in this manner is the second phase of the present invention. Various halogenating agents, particularly bromine or chlorine compounds are capable of converting the alcohols to the corresponding halides and of shifting the position of the ene group. Especially preferred for use is phosphorous tribromide. The reaction should be conducted in the presence of an organic base, preferably a nitrogenous one like pyridine, in order to obtain appreciable yields of the 1-halo, 2-ene, 4-yne product. An inert solvent is best used also, dry ether being particularly suitable. The system is then refluxed for a short time, and the product distilled if desired. Yields ranging up to about 80% of theory are thus readily obtainable. The reaction may be expressed thus:

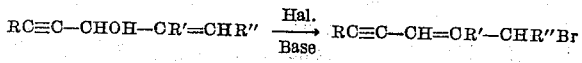

According to the third operation in this novel process, such halogenated, unsaturated compounds are converted to the corresponding nitriles by treatment with cuprous cyanide in an inert solvent, such as xylene, toluene or other aromatic hydrocarbon. The reaction generally requires heating for a short time, say one-half to one hour in the refluxing solvent. The resulting unsaturated nitrile may be recovered by any desired means, e. g. by decanting the cooled solution from residual material, extracting with a suitable solvent like ether, and distilling to purify. Cuprous cyanide is most effective in approximately the proportion of one mole per mole of halogenated compound. A small amount of a metallic iodide (e. g. sodium iodide) may be used to facilitate the reaction but it is not essential for a good yield. The nitrile products are readily isolated in yields up to about 60%. The reaction may be represented by the following equation:

It has been found that for some reason only cuprous cyanide is useful, and other like salts, notably sodium cyanide, zinc cyanide and silver cyanide are not operable.

An unsaturated nitrile so prepared is then hydrolyzed to obtain a 3-ene,5-ynoic acid compound, i. e. a free acid itself or an acid function derivative thereof. It may be feasible to react the nitriles simply with water, recovering the free acids directly. However, the nitriles may most conveniently be converted to the corresponding acids through the initial formation of novel ester derivatives. To implement this, the nitrile is dissolved in a small volume of a lower aliphatic alcohol, such as methanol, ethanol, butanol, etc. A small proportion of water may be added and dry halogen halide, preferably hydrogen chloride, is passed through the mixture. The reaction tends to be quite violent and, if large quantities are used, careful cooling is important. Apparently an imino ether hydrohalide is formed as an intermediate. Upon treatment of this compound with excess water, the corresponding ester is formed. This may be purified by extraction and distillation or other conventional means. Generally good yields are obtained. Such an ester may then be contacted with dilute aqueous alkali, or preferably with a mixture of dilute aqueous alkali and a lower alcohol to increase the solubility of the reactant. The corresponding free 3-ene,5-yne carboxylic acid is formed. Normally this reaction is conducted at about room temperature and is completed in a few hours. By acidification of the mixture after removal of any alcohol and unreacted ester, the unsaturated acid separates, usually as an oil.

These reactions may be exemplified as (R''' is a lower alkyl group):

R'''OH + RC≡C—CH=CR'—CHR''CN ⟶

RC≡C—CH=CR'—CHR''—COOR''' $\xrightarrow[\text{alk.}]{\text{aq.}}$

RC≡C—CH=CR'—CHR''—COOH

The 2-ene,5-yne acids may be crystallized and purified, if desired, by cooling a solution thereof in a lower aliphatic hydrocarbon like hexane or butane, to a temperature of about −40° C. or lower, and then filtering the precipitate, preferably in an inert atmosphere. The resulting crystals generally melt when warmed up to room temperature. The identity of the products has been established by measurements of various physical constants, such as ultraviolet and in particular infrared absorption spectra. This class of 3-ene,5-yne aliphatic carboxylic acids and their acid function derivatives shows definite antimicrobial activity, in particular against the mycobacteria, hence is of great utility in pharmaceutical and medical work.

During the aqueous alkaline hydrolysis of these esters, secondary products are formed in addition to the new class of acids. These secondary compounds are present in the mother liquor obtained after low-temperature filtration of the crystalline normal acids. Removal of the hydrocarbon-type solvents from the filtrate leaves syrups which have even higher antibacterial activity than do the crystallized acids. Activity of these concentrates is such that the incorporation of 10 micrograms thereof in one milliliter of a standard agar test medium will completely inhibit the growth of many mycobacteria. Study of such residual material in the mother liquors indicates that it may contain various acids isomeric with the normal 3-ene, 5-ynoic acids isolated in crystalline form. For instance, one isomer may be:

RCH=C=CH—CR'=CR''—COOH

Another may be: RCH₂—C≡C—CR'=CR''—COOH

Selective hydrogenation of the 3-ene,5-yne acid compound is the fifth step in effectuating the new process of this invention. The acetylenic bond is thus reduced to a double bond, yielding the corresponding 3,5-dienic acid compound. The 2,3 double bond is untouched. This selective reaction is best carried out by treating the intermediate with hydrogen in the presence of a suitable catalyst. "Poisoned" palladium is particularly valuable for this purpose. Examples of such a catalyst are palladium deactivated with lead, palladium treated with sulfur-quinoline, etc. Atmospheric hydrogen pressure is preferred, but pressures up to about 10 atmospheres may be used, and reaction temperatures of from about 15 to about 50° C. are best. The reaction may be depicted as follows: RC≡C—CH=CR'—CHR''—COOH (or a derivative)

$\xrightarrow{H_2}$ RCH=CH—CH=CR'—CHR''—COOH (or a derivative).

The final product of a dienic carboxylic acid or its derivative is often obtained principally in the cis, trans form, the cis configuration occurring at the reduced bond. The cis, trans acids may be converted at will to the trans, trans acids by treatment with iodine, nitrous oxide or the like in a suitable non-reactive solvent. Many other agents for this type of isomerization or transition are reported in the chemical literature.

The following table lists a series of typical compounds, useful intermediates and final products, prepared by the reactions hereinabove described. Each of these compounds has been identified by various physical constants and analyses. It will be noted that the generic R' and R'' of the formulas previously given are here hydrogen, R is the radical C₇H₁₅—, and R''' is a methyl group.

| Compound | Melting Point, °C. | Refractive Index, $n_D^{25}$ | Ultraviolet Absorption 95% ethanol | | | Analyses | |
|---|---|---|---|---|---|---|---|
| | | | Max. mµ | $E^{1\%}_{1\,cm.}$ | ε | Calculated | Found |
| I | | 1.4612 | | | | C: 80.00<br>H: 11.11 | 79.92<br>11.08 |
| II | −35 to −34 | 1.5098 | 240<br>227<br>236 | 557<br>757<br>676 | 13,500<br>14,300<br>12,800 | Br: 32.92 | 32.87 |
| III | | 1.4789 | 227<br>235.5 | 570<br>546 | 12,600<br>12,100 | N: 7.44 | 6.99 |
| IV | | 1.4730 | | | | C: 75.68<br>H: 9.91 | 75.84<br>9.95 |
| V | −10 to −9 | 1.4651 | 233 | 672 | 15,100 | C: 75.01<br>H: 10.71 | 75.06<br>10.81 |
| VI | | 1.4631 | 229 | 642 | 14,400 | C: 75.01<br>H: 10.71 | 75.13<br>10.28 |

I  C₇H₁₅—C≡C—CHOH—CH=CH₂

II  C₇H₁₅—C≡C—CH=CH—CH₂Br

III  C₇H₁₅—C≡C—CH=CH—CH₂—C≡N

IV  C₇H₁₅—C≡C—CH=CH—CH₂—CO₂CH₃

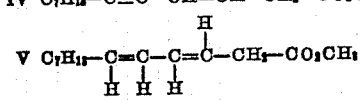

V  C₇H₁₅—C=C—C=C—CH₂—CO₂CH₃
         | | | |
         H H H H

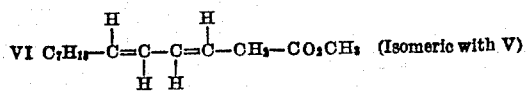

VI  C₇H₁₅—C=C—C=C—CH₂—CO₂CH₃   (Isomeric with V)
          | |   | |
          H H   H H The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

*Example I*

Compound I of the above table, n-dodeca-1-ene-4-yne-3-ol was first prepared. The Grignard reagent of nonyne-1 was obtained by treating 93 grams (0.75 mole) of the acetylenic hydrocarbon in 50 mls. of dry ether with 330 mls. of 2.8 N ethyl magnesium bromide in diethyl ether. After the Grignard reagent had been formed, a solution of 50.4 grams (0.9 mole) of acrolein in 60 mls. of dry ether was added dropwise with agitation. The flask was protected from atmospheric moisture and cooled in an ice bath. The acrolein was added at such a rate (a total of 30 minutes) that moderate refluxing of the ether was maintained. After all of the acrolein had been introduced, the reaction mixture was stirred for three hours in an ice bath and allowed to stand at room temperature overnight. The mixture was then cooled in ice and treated with an excess of a saturated aqueous solution of ammonium chloride. The organic phase was separated, washed with water and dried over anhydrous sodium sulfate. The ether was evaporated under reduced pressure and the residual material was distilled at a pressure of less than 1 millimeter in a modified Claisen-type flask. The distilled alcohol product weighed 75 grams (56% yield). It was obtained as a colorless liquid, having the physical properties listed in the above table.

Compound II of the above table, 1-bromo-n-dodeca-2-ene-4-yne, was next made. Fifty-four grams (0.3 mole) of the secondary alcohol just prepared was dissolved in 100 mls. of ice cold dry ether containing 2.4 mls. of dry pyridine and stirred in a flask protected from atmospheric moisture. A solution of 42.7 grams of phosphorous tribromide in 30 mls. of dry ether was added over a period of 15 minutes. The reaction mixture was then heated to a gentle reflux and maintained at this temperature for 20 minutes. The ether solution was poured onto crushed ice, separated therefrom, and washed with water, 10% aqueous sodium carbonate solution and again with water. After drying over anhydrous sodium sulfate, the ether was removed under vacuum and the residue was distilled at low pressure in a modified Claisen-type flask. The yield of the desired bromo compound, recovered as a colorless liquid, was 58.8 grams (81%).

This product was in turn utilized in the preparation of Compound III of the above table, n-trideca-3-ene-5-yne-nitrile. A solution of 6.0 grams (0.024 mole) of the bromo intermediate in 5 mls. of p-xylene was treated with 3.0 grams (0.036 mole) of dry cuprous cyanide and 50 mg. of sodium iodide. The mixture was stirred and heated so that gentle refluxing occurred. After a short time, the rate of refluxing suddenly increased and the reaction mixture darkened considerably. Samples were withdrawn from time to time and tested with silver nitrate for the presence of active organic halogen. After one hour, this test was negative and heating was discontinued. The mixture was cooled and triturated with ether several times. The ether extracts were combined and filtered and the solvent was removed under vacuum. The residual material was fractionally distilled and the desired unsaturated nitrile was collected as a colorless liquid boiling at 100 to 101° C. under a pressure of 0.45 mm. of mercury. The product weighed 1.4 grams (31% yield). It was found to be rather unstable, darkening on storage at low temperature.

A portion of this nitrile was used soon after its formation, in order to prepare Compound IV of the above table, or the methyl ester of n-trideca-3-ene-5-ynoic acid. A solution of 3.1 grams (0.016 mole) of the nitrile in 10 mls. of methanol and 1 ml. of water was treated with a slow stream of anhydrous hydrogen chloride gas. The material, in a flask equipped with a reflux condenser, was cooled by an ice water bath. The reaction soon subsided and after 10 minutes the mass was poured into a crushed ice-water mixture. The organic phase was separated by extraction with ether and the ether solution was washed with water, dilute sodium carbonate solution and again with water. After drying the ether solution over anhydrous sodium sulfate, the solvent was removed under vacuum and the residue was distilled at less than 1 mm. pressure. In this way, 2.82 grams (80% yield) of the colorless liquid methyl ester was obtained.

This ester was then selectively reduced to obtain Compound V, above described, i. e. methyl trideca-3,5-dienoate. To do this, an ethyl acetate suspension of lead-"poisoned" palladium catalyst supported on barium sulfate was pre-reduced with hydrogen at about 1 atmosphere pressure and room temperature. A sample of the Compound IV material, dissolved in ethyl acetate, was added to the hydrogenation flask. The mixture was stirred under hydrogen until one mole of the gas had been absorbed. The catalyst was filtered and washed with a small volume of ethyl acetate. The filtrate and washings were combined and concentrated under reduced pressure and the residue was distilled under vacuum. The dienoic ester thus obtained was a colorless liquid. The yield in this reaction averaged 86 to 90%.

This last compound appeared to have the trans configuration at the 3-double bond and the cis configuration at the 5-double bond where the triple bond originally occurred. It was isomerized to Compound VI, apparently the trans, trans ester. A solution of 0.6 gram of product V in 6 mls. of carbon tetrachloride was treated with 0.3 ml. of 0.1 N iodine in carbon tetrachloride. The reaction mixture was allowed to stand in a glass-stoppered pyrex flask in diffuse light at 32° C. From time to time samples were removed for determination of the infrared absorption spectrum. These measurements indicated that transition was complete at the end of 72 hours. The solvent was thereupon removed in a stream of dry nitrogen. The residue was placed in an evacuated desiccator until all of the iodine had sublimed and then molecularly distilled. The yield of the trans, trans ester was 80%. It was obtained as a colorless oil having the properties listed in the above table.

*Example II*

Using the procedure of Example I but substituting pentyne-1 for the nonyne-1 in the initial reaction, compounds corresponding to I through V of the table were readily prepared, wherein the $C_7H_{15}$ radical (R in the generic formulas) was replaced by $C_3H_7$.

*Example III*

Ethyl n-trideca-3-ene-5-ynoate was obtained in accordance with Example I procedure, using ethanol in lieu of methanol to hydrolyze the nitrile intermediate. A portion of this (0.8 gram) was dissolved in 3 mls. of 1 N alcoholic potassium hydroxide and 10 mls. of water were added. The mixture was allowed to stand at room temperature for 16 hours and then extracted with ether. The aqueous phase was adjusted to a pH of approximately 2 with dilute mineral acid and the oil which separated was extracted into ether. The ether solution was dried by addition of carbon tetrachloride and distillation. The crude residual product was dissolved in butane at the boiling point of this solvent. The resulting solution was cooled by means of a dry ice-acetone bath to about −60° C. The crystalline product which separated was filtered in a cold, dry, inert atmosphere. The crystals melted and were allowed to warm to room temperature. Ultraviolet and infrared measurements on the product showed it to be the normal acid obtained by simple hydrolysis of the ethyl ester.

This acid and free trideca-3,5 dienoic acid were incorporated at a level of about 100 mcg./ml. in a standard nutrient agar medium. Each new compound was found capable of completely inhibiting growth of *Mycobacteria phlei*, 607 and *smegmatis*, when the agar was inoculated by these organisms according to conventional testing technique.

The butane mother liquor from the n-trideca-3-ene-5-ynoic acid preparation was evaporated to dryness and the syrupy product so obtained was similarly assayed against the same microorganisms. This concentrate was found to completely inhibit the growth of the Mycobacteria

What is claimed is:

1. A process which comprises condensing an acetylenic compound of the formula RC≡CM with a 2,3-unsaturated aliphatic aldehyde of the formula

R''CH=CR'—CHO wherein R, R' and R'' are chosen from the group consisting of hydrogen and 1-to-10-carbon atom alkyl radicals, and M is a member of the class consisting of alkali metals and a Grignard group, contacting the resulting secondary alcohol with a halogenating reagent in the presence of an organic base, heating the so formed 1-halo-2-ene-4-yne compound with cuprous cyanide, hydrolyzing the nitrile thereby obtained, selectively hydrogenating the acetylenic bond of the resulting 3-ene,5-ynoic acid compound, and recovering the 3,5-dienic acid product.

2. A process as claimed in claim 1 wherein the acetylenic compound is a relatively short chain 1 to 10 carbon atom mono-alkyl acetylene Grignard reagent and the unsaturated aldehyde is acrolein.

3. A process as claimed in claim 1 wherein the secondary alcohol is halogenated by treatment with phosphorous tribromide in the presence of pyridine.

4. A process as claimed in claim 1 wherein the reaction with cuprous cyanide is effected by refluxing in an aromatic hydrocarbon solvent.

5. A process as claimed in claim 1 wherein the nitrile is hydrolyzed by contacting it with a lower aliphatic alcohol in the presence of anhydrous hydrogen chloride, and the resulting ester is then treated with dilute aqueous alkali to obtain the 3-ene,5-ynoic free acid.

6. A process as claimed in claim 1 wherein the acetylenic bond is hydrogenated by contacting the compound with hydrogen in the presence of a poisoned palladium catalyst at an elevated pressure and at a temperature of from about 15° to about 50° C.

7. The compound n-trideca-3-ene-5-ynoic acid.

8. The compound trideca-3,5-dienoic acid.

References Cited in the file of this patent

UNITED STATES PATENTS 843,289   Moureu _____ Feb. 5, 1907

OTHER REFERENCES

Paul et al.: C. A., vol. 42, page 4516g. Citing Bull. Soc. Chim. France, 1948, pages 108–15.

Paul et al.: C. A., vol. 41, page 4089h. Citing Compt. rend. 224, pages 1118–19 (1947).

Beilstein, Vierte Auflage, Zweiter Band (copyright 1920), p. 489, No. 5 and p. 491, No. 2.